US012457009B2

(12) United States Patent
Botimer et al.

(10) Patent No.: US 12,457,009 B2
(45) Date of Patent: Oct. 28, 2025

(54) RADIO FREQUENCY TRANSMISSION LINE SYSTEM FOR A MULTI-THERMAL ENVIRONMENT

(71) Applicant: NORTHROP GRUMMAN SYSTEMS CORPORATION, Falls Church, VA (US)

(72) Inventors: Jeffrey D. Botimer, Columbia, MD (US); Justin Tyler Mroczkowski, Towson, MD (US); James R. Medford, Columbia, MD (US); Andrew Paul Lisiewski, Woodstock, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 187 days.

(21) Appl. No.: 18/412,834

(22) Filed: Jan. 15, 2024

(65) Prior Publication Data

US 2025/0233615 A1 Jul. 17, 2025

(51) Int. Cl.
*H04B 3/32* (2006.01)
*H04B 3/04* (2006.01)

(52) U.S. Cl.
CPC ............. *H04B 3/32* (2013.01); *H04B 3/04* (2013.01)

(58) Field of Classification Search
CPC ... H04B 3/04; H04B 3/32; H04B 1/00; H04B 3/00
See application file for complete search history.

(56) References Cited

U.S. PATENT DOCUMENTS 5,831,489 A * 11/1998 Wire ..................... H05K 9/0075
361/728
10,784,584 B1 * 9/2020 McNutt ................ H01Q 13/203

* cited by examiner

*Primary Examiner* — David S Huang
(74) *Attorney, Agent, or Firm* — Tarolli, Sundheim, Covell &Tummino LLP

(57) ABSTRACT

A radio frequency (RF) transmission line system for a multi-thermal environment and method for fabricating the same are provided. In one example, an RF transmission line system a transmission line conductor configured to cooperate to propagate an RF signal from a first thermal environment to a second thermal environment. The first thermal environment has a first temperature and the second thermal environment has a second temperature less than the first temperature. The RF transmission line system also includes a ground plane and a dielectric material that is coupled between the transmission line conductor and the ground plane. The RF transmission line system further includes a galvanic connected resonant structure that electrically couples the transmission line conductor to the ground plane.

20 Claims, 5 Drawing Sheets

RADIO FREQUENCY TRANSMISSION LINE SYSTEM FOR A MULTI-THERMAL ENVIRONMENT

GOVERNMENT INTEREST

The invention was made under Government Contract. Therefore, the U.S. Government has rights to the invention as specified in that contract.

TECHNICAL FIELD

This description relates to a radio frequency (RF) signal line with a galvanic connected resonant structure for use in a multi-thermal environment.

BACKGROUND

Radio frequency (RF) transmission lines are used in numerous applications. For example, RF transmission lines are used to propagate data between devices at room temperature and other devices (e.g., superconductors) in an environment that is colder than room temperature (e.g., a cryogenic temperature environment). However, the RF transmission lines include conductors that can conduct heat from the room temperature environment to the devices in the colder environment, resulting in a thermal exchange that heats the devices in the colder environment. Operation of the devices in the colder environment may be negatively impacted from the thermal exchange.

SUMMARY

A first example is related to a radio frequency (RF) transmission line system. The RF transmission line system includes a transmission line conductor configured to cooperate to propagate an RF signal from a first thermal environment to a second thermal environment. The first thermal environment has a first temperature and the second thermal environment has a second temperature less than the first temperature. The RF transmission line system also includes a ground plane and a dielectric material that is coupled between the transmission line conductor and the ground plane. The RF transmission line system further includes a galvanic connected resonant structure that electrically couples the transmission line conductor to the ground plane.

A second example is related to a method for fabricating a radio frequency (RF) transmission line system. The method includes fabricating an RF transmission line system comprising a first transmission line conductor and a second transmission line conductor. The first and second transmission line conductors are configured to cooperate to propagate an RF signal from a first thermal environment to a second thermal environment. The first thermal environment has a first temperature, and the second thermal environment has a second temperature less than the first temperature. The method also includes providing a line dielectric material in the second thermal environment to separate the first transmission line conductor and the second transmission line conductor. The method further includes providing a ground plane in the second thermal environment. The method yet further includes providing a galvanic connected resonant structure in the second thermal environment to electrically couple the first transmission line conductor to the ground plane.

A third example is related to a communication system including the RF transmission line for a multi-thermal environment. The communication system includes a signal source in a first thermal environment at a first temperature. The signal source is configured to propagate an RF signal. The communication system also includes a superconducting circuit in a second thermal environment at a second temperature lower than the first temperature. The communication system further includes an RF transmission line system that electrically couples the signal source to the superconducting circuit. The RF transmission line system includes a transmission line conductor configured to propagate the RF signal from the first thermal environment to the second thermal environment, a dielectric material that is coupled between the transmission line conductor and a ground plane, and a galvanic connected resonant structure that electrically couples the transmission line conductor to the ground plane.

DETAILED DESCRIPTION

Properly thermalizing radio frequency (RF) transmission lines is difficult based on a thermal exchange in a multi-thermal environment. For example, thermalizing the center pin of a radio frequency (RF) coaxial cable at milli-Kelvin (mk) temperatures is a very difficult task because heat transfer through phonons is poor below 500 mK. Historically, the solution to this problem has been to heavily attenuate the RF transmission line, creating an electrical path to ground with a resistance on the order of 10s of ohms. However, the attenuation can be a serious problem on a transmission line where signal to noise is important, and ohms is a large resistive barrier for thermal conduction at mK temperatures. The attenuators reduce radiation traveling down the line from hotter components in a first thermal environment but provide a poor electrical connection to ground for cooling the RF transmission line (e.g., a center coaxial line). Thermal conductivity is proportional to electrical conductivity, and a poor electrical connection leads to a poor thermal connection.

The systems and methods herein provide galvanic connected resonant structures that operate as a passband filter having a bandwidth based on a wavelength. The galvanic connected resonant structure provides a low resistance electrical path from a conductor of an RF transmission line to ground. The galvanic connected resonant structure has a structure length between the first transmission line conductor and a ground connection.

The galvanic connected resonant structures to ground provide a frequency dependent electrical connection to ground at mK temperatures, thereby creating a strong thermal connection between the otherwise isolated RF transmission line and ground. Accordingly, negative impacts on superconducting circuits or other devices resulting from a thermal exchange from a first environment to a colder second environment can be mitigated, which can reduce thermal induced noise in the RF transmission line system.

Figure 1:
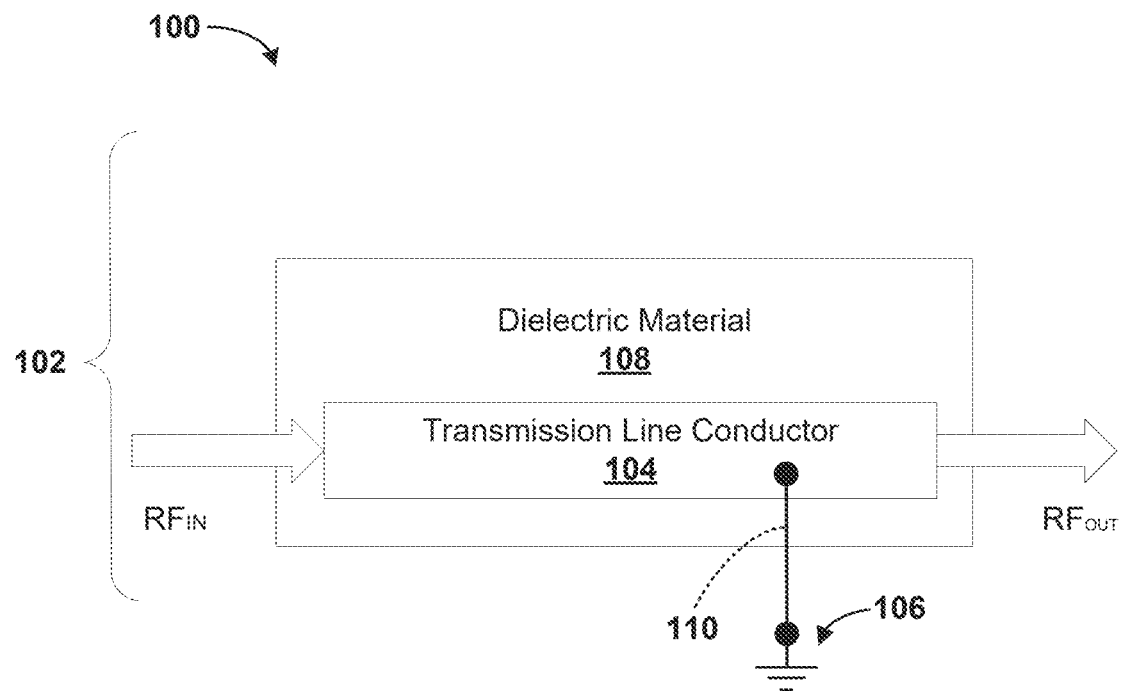
FIG. 1 illustrates an example of a radio frequency (RF) transmission line system for a multi-thermal environment.

FIG. 1 illustrates an example of a radio frequency (RF) transmission line system 100 for a multi-thermal environment. The RF transmission line system 100 includes a transmission line 102 including a transmission line conductor 104 and a ground plane 106. For example, the transmission line conductor 104 is formed as a wire of a first conductive material, such as copper or copper-clad steel. The transmission line conductor 104 is configured to propagate an RF signal having a desired frequency and may be a stripline, micro-stripline, waveguide, and coplanar waveguide, among others. The ground plane 106 is a grounded conductor formed from a second conductive material. In one example, the ground plane 106 transmission line conductor 104 is located a distance from the first transmission line conduction 104. The second conductive material can be the same or different than the first conductive material and include copper, aluminum, or other metals that are a suitable conductor, transmission line conductor 104

The RF transmission line system 100 also includes a dielectric material 108 that transmission line conductor 104 bounds or at least partially surrounds the first transmission line conductor. The dielectric material 108 acts as an insulator that separates the transmission line conductor 104 and the ground plane 106. The dielectric material 108 may be polyethylene, closed-cell foam, or other suitable insulator. A galvanic connected resonant structure 110 electrically couples the transmission line conductor 104 to the ground plane 106. For example, the galvanic connected resonant structure 110 can be coupled to the ground plane 106 that is arranged in a low-temperature environment, such as a cryogenic environment. As a result, the galvanic connected resonant structure 110 can provide a thermal exchange to cool the transmission line conductor 104.

The galvanic connected resonant structure 110 has a resonance based on the desired frequency, and therefore acts as a band pass filter. The galvanic connected resonant structure 110 provides a galvanic connection between the transmission line conductor 104 and the ground plane 106. For example, the galvanic connected resonant structure 110 may be a passive resonant structure (e.g., a via, a secondary stripline, etc.) or active resonant structure (e.g., a transistor, a Josephson junction, a clock generator, an amplifier, etc.) that creates resonance that mitigates signal loss of the desired frequency. Thus, the galvanic connected resonant structure 110 can act as both a thermal pass and a band pass filter. For example, the galvanic connected resonant structure can act as a thermal pass because the galvanic connected resonant structure 110 provides a galvanic connection from the transmission line conductor 104 in a first thermal environment to the ground plane 106 in a second, colder, environment. As another example, the galvanic connected resonant structure can act as a band pass filter because the resonant structure of the galvanic connected resonant structure 110 mitigates signal loss. While a single galvanic connected resonant structure 110 is shown in the RF transmission line system 100, a plurality of galvanic connected resonant structures may be used in an RF transmission line system 100.

Figure 2:
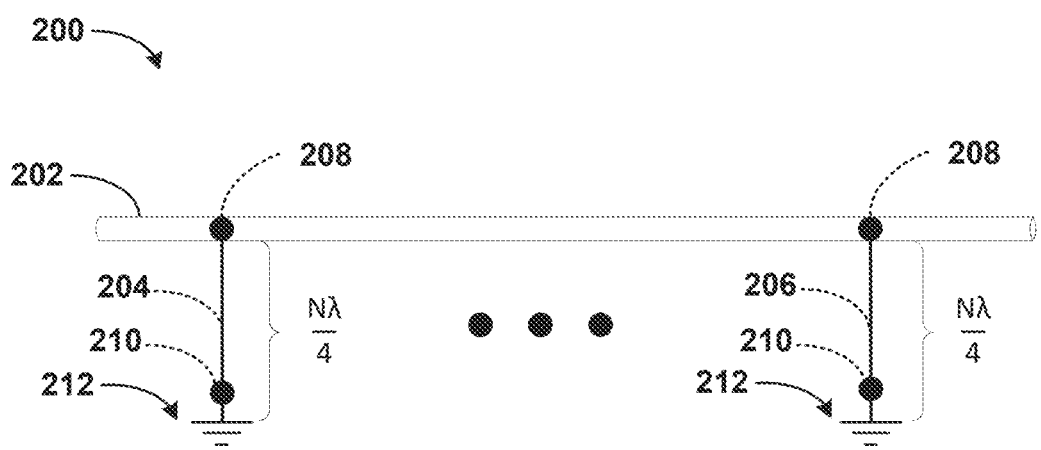
FIG. 2 illustrates an example diagram of galvanic connected resonant structures for the RF transmission line system.

Turning to FIG. 2, a plurality of galvanic connected resonant structures extending from a transmission line 202 in an RF transmission line system 200 is shown. For purposes of simplification, the plurality of galvanic connected resonant structures includes a first galvanic connected resonant structure 204 and a second galvanic connected resonant structure 206 although more galvanic connected resonant structures may be used. The number of galvanic connected resonant structures can be proportional to an amount of attenuation incurred by the transmission line 202, but can also provide a more efficient thermal exchange. The number of galvanic connected resonant structures in the plurality of galvanic connected resonant structures may thus be determined based on the frequency dependent electrical connection to ground at mk temperatures relative to the amount of attenuation. The transmission line 202 may have a similar structure as the transmission line 102 of FIG. 1. Likewise, the galvanic connected resonant structures 204, 206 may be formed of a shunt line having a similar structure as the transmission line 102 of FIG. 1 and include a first conductor and a second conductor separated by a dielectric material. In some examples, the galvanic connected resonant structures 204, 206 are formed of the transmission line 202 and have the structure described above with respect to the transmission line 102 of FIG. 1.

For clarity, the structure of the galvanic connected resonant structures 204, 206 will be described with respect to the first galvanic connected resonant structure 204 but hold for other galvanic connected resonant structures of the plurality of galvanic connected resonant structures, such as the second galvanic connected resonant structure 206. The galvanic connected resonant structures 204, 206 have a first shunt end 208 and a second shunt end 210. The first shunt end 208 is attached at the transmission line 202. In one example, the first shunt end 208 is attached to the transmission line conductor 104, as shown in FIG. 1. The second shunt end 210 is a connection to ground 212. The galvanic connected resonant structures 204, 206 can each have a structure length from the first shunt end 208 to the second shunt end 210 that is an integer multiple of one-quarter of a wavelength of the RF signal, given as $N\lambda/4$. For example, the structure length can be an odd integer multiple of approximately one quarter of the wavelength of the RF signal being propagated by the transmission line 202 to form a band pass filter. As another example, the structure length may be a half wavelength (i.e., an even integer multiple) of the RF signal being propagated by the transmission line 202 to form a band stop filter. As an example with reference to FIG. 1, the galvanic connected resonant structures 204, 206 have a structure length between the transmission line 202, such as the transmission line conductor 104, and the ground connection, such as the ground connection 112. The RF signal on the galvanic connected resonant structure 204, 206 exhibits a standing wave node based on the second shunt end 210 being coupled to ground, and exhibits a standing wave anti-node at the first shunt end 208 based on the length of the galvanic connected resonant structure 204, 206 being a quarter multiple wavelength of the wavelength of the RF signal. Accordingly, the transmission line 202 experiences low loss while the galvanic connected resonant structures 204, 206 provide a thermal connection that shunt heat from the transmission line 202 to ground thereby mitigating thermal induced noise in the transmission line 202.

Figure 3A:
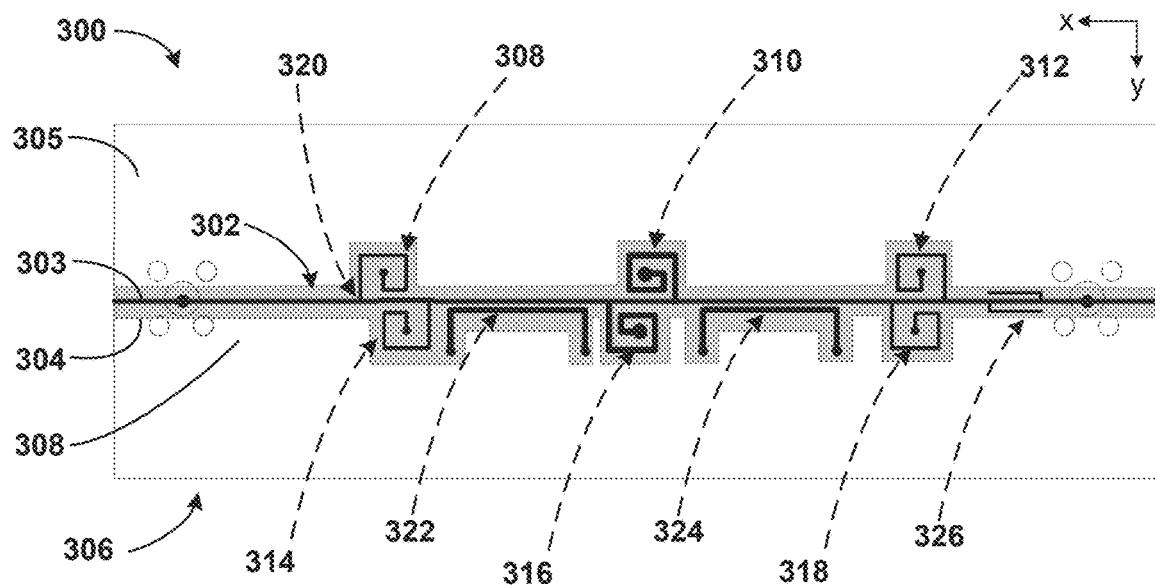
FIG. 3A illustrates an example of a top view of the RF transmission line system for a multi-thermal environment.
Figure 3B:
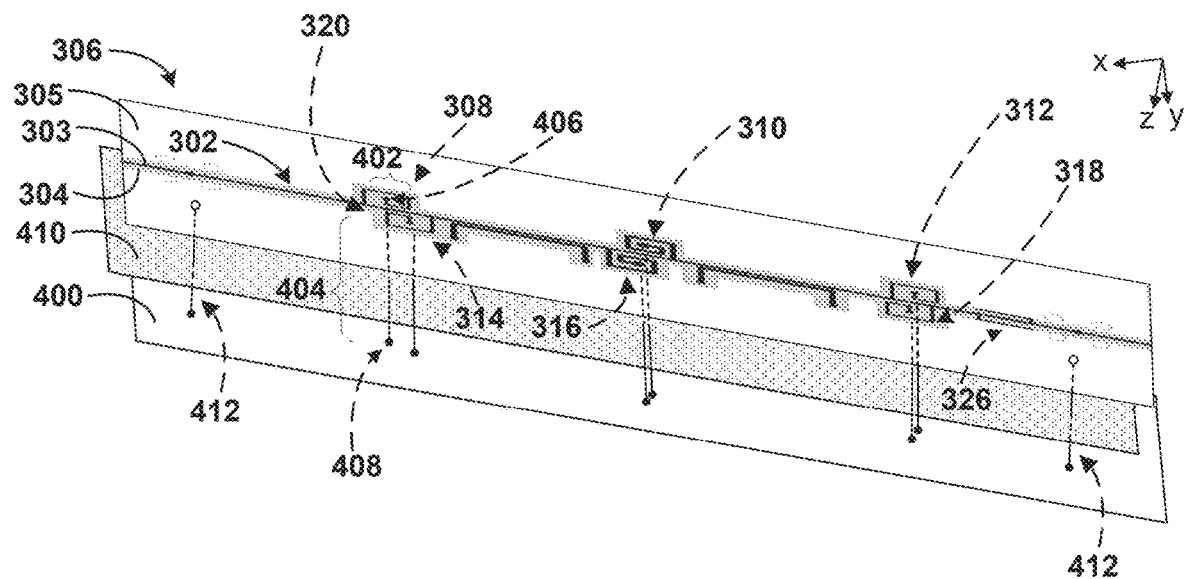
FIG. 3B illustrates an example of an exploded perspective view of the RF transmission line system having a single ground plane.
Figure 3C:
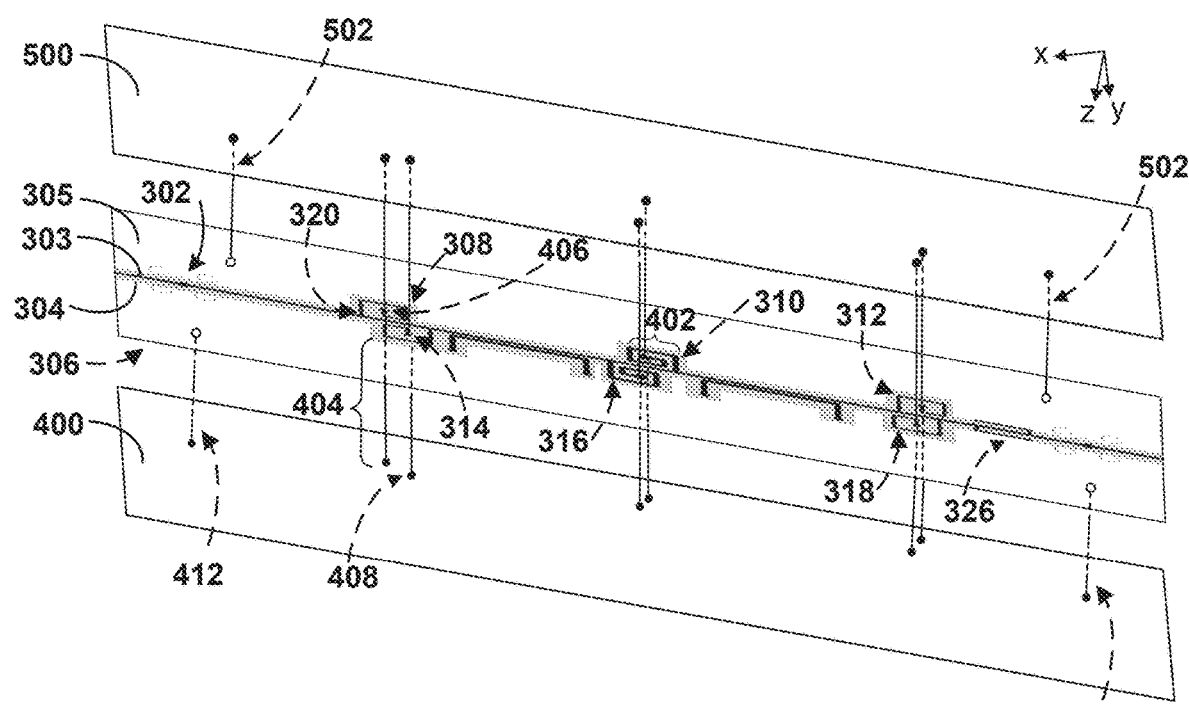
FIG. 3C illustrates an example of an exploded perspective view of the RF transmission line system having a plurality of ground planes.

FIG. 3A illustrates an example of a top view of the RF transmission line system 300 in a circuit board layout. FIGS. 3B and 3C show an exploded view of the circuit board layout within different embodiments of the RF transmission line system 300. For purposes of simplification, FIGS. 3A-3C employ the same reference numbers to denote the same structure. The RF transmission line system 300 includes a transmission line 302. The transmission line 302 includes a first transmission line conductor 303 that is formed as a metallic trace in a dielectric material 304. The transmission line 302 also includes a second transmission line conductor 305 that can be grounded, as described in greater detail below. The first and second transmission line conductors are configured to cooperate to propagate an RF signal from a first thermal environment to a second thermal environment.

In the example of FIG. 3A, the transmission line 302 is demonstrated as a conductor-backed coplanar waveguide, such as having a stripline configuration. Thus, as described herein, the transmission line 302 is demonstrated as being formed on a transmission line layer 306. The transmission line layer 306 may be formed on a printed circuit board, which can include or correspond to a dielectric layer, as described in greater detail below. In some examples, a transmission line system includes a coplanar waveguide having a transmission line 302 (e.g., the transmission line conductor 104 of FIG. 1) in a dielectric material 304 printed on a surface of a transmission line layer 306.

The RF transmission line system 300 has a number of galvanic connected resonant structures including a first galvanic connected resonant structure 308, a second galvanic connected resonant structure 310, a third galvanic connected resonant structure 312, a fourth galvanic connected resonant structure 314, a fifth galvanic connected resonant structure 316, and a sixth galvanic connected resonant structure 318. The galvanic connected resonant structures 308-318 are electrically coupled to the transmission line 302 at a first shunt end 320. For example, the first galvanic connected resonant structure 308 is electrically coupled to the transmission line 302 at the first shunt end 320. The structure length of the galvanic connected resonant structures 308-318 extends from the first shunt end 320 to a second shunt end that is electrically shorted to ground. The location of the second shunt end may be based on the configuration of the ground.

As shown in the exploded perspective view of the RF transmission line system 300 in FIG. 3B, the RF transmission line system 300 includes a first ground plane 400 that is a single ground plane. The first ground plane 400 is an electrically conductive surface that is connected to ground. As one example, the first ground plane 400 is an approximately flat sheet of conductive metal, such as an area of copper foil on the transmission line layer 306 (not shown) connected to ground. In another example, the first ground plane 400 is approximately parallel to a plane, in the x-y direction, defined by the surface of the transmission line layer 306.

In FIG. 3B, each of the galvanic connected resonant structures 308-318 extends from the first shunt end 320 to the first ground plane 400. In some examples, the galvanic connected resonant structures 308-318 are formed by a first segment 402 and a second segment 404 that can be formed as a conductive via that interconnects the first segment 402 to the ground plane 400. The first segment 402 may be a two-dimensional shape arranged in the dielectric material 304 on the x-y plane. For example, the first segment 402 is arranged in a spiral shape on the surface of the transmission line layer 306 in the x-y plane. The spiral shape may be an angular spiral shape as shown in FIG. 3B or a curved spiral shape. The first segment 402 may extend in the x-y plane in other shapes, such as a line, a rectangular shape, a circular shape, a triangular shape, irregular shape, etc. The shape of the first segment 402 in the x-y plane, such as the spiral shape, may be configured to reduce the area of the first segment 402 on the transmission line layer 306, thereby saving space on the surface of the transmission line layer 306. In an example of the first segment 402 forming a shape, the structure length is equal to the perimeter of the shape or a length of the line that forms the shape.

The second segment 404 extends as a conductive via generally in the z-direction approximately orthogonal to the x-y plane from a segment end 406 in the x-y plane and through the substrate layer. In the example of the first segment 402 being a spiral shape, an outer portion of the spiral shape emanates from the segment end 406 and is coupled to the first transmission line conductor 303 at the first shunt end 320 and the second segment 404 extends from the segment end 406 to the first ground plane 400. A second segment length of the second segment 404 is defined from the segment end 406 to a ground connection 408 at the first ground plane 400.

In the single ground plane example shown in FIG. 3B, the structure length includes both the first segment length of the first segment 402 and the second segment length of the second segment 404. Accordingly, the structure length extends from the first shunt end 320 to the ground connection 408 so that the ground connection 408 is the second shunt end. As discussed above, the structure length is approximately an integer multiple of a quarter wavelength of the RF signal being propagated by the transmission line 302. Therefore, the first segment length of the first segment 402 plus the second segment length of the second segment 404 equals an integer multiple of a quarter wavelength of the RF signal when the galvanic connected resonant structures 308-318 extend to a single ground plane, here, the first ground plane 400.

In some examples, the RF transmission line system 300 includes a dielectric layer 410 that separates the transmission line layer 306 from the first ground plane 400. In some examples, the dielectric material of the dielectric layer 410 interconnects the galvanic connected resonant structures 308-318 and the transmission line layer 306 (e.g., the transmission line conductor 104). The dielectric layer 410 offers additional insulation for the transmission line 302. The first segment 402 is a two-dimensional shape arranged in the x-y plane of the transmission line layer 306 in the x-y plane. The second segment 404 extends generally in the z-direction approximately orthogonal to the x-y plane from a segment end 406 to the ground connection 408 that is the second end in the single ground plane embodiment. Because the transmission line layer 306 is separated from the first ground plane 400 by the dielectric layer 410, the second segment 404 traverses the dielectric layer 410. Additionally, ground vias 412 electrically connect the second transmission line conductor 305 in the transmission line layer 306 to the ground plane 400 to provide a ground connection to the second transmission line conductor 305.

FIG. 3C illustrates an example of an exploded perspective view of the RF transmission line system having a plurality of ground planes. The plurality of ground planes includes the first ground plane 400 and a second ground plane 500 separated from the first ground plane 400 by the transmission line layer 306. The first ground plane 400 and the second ground plane 500 may be separated from the transmission line 302 by dielectric layers (e.g., the dielectric layer 410). Accordingly, the ground planes 400, 500 may be electrically isolated from the transmission line 302 with additional layers. Here, the galvanic connected resonant structures 308-318 are electrically coupled to the first ground plane 400 and the second ground plane 500. Additionally, ground vias 502 electrically connect the second transmission line conductor 305 in the transmission line layer 306 to the ground plane 500 to provide a ground connection to the second transmission line conductor 305.

In an embodiment with a plurality of ground planes, the structure length of galvanic connected resonant structures 308-318 is defined by the first segment length of the first segment 402 in the x-y plane. The first segment length extends from the first shunt end 320 to the segment end 406. Accordingly, structure length of the galvanic connected resonant structures 308-318 is the first segment length of the first segment 402, which is equal to an integer multiple of a quarter wavelength of the wavelength propagated by the transmission line 302. In the embodiment with a plurality of ground planes, the second segment 404 is not a portion of the galvanic connected resonant structures 308-318, but instead, operates as a conductive via to either the first ground plane 400 or the second ground plane 500. The length of the conductive vias does not contribute to the structure length of the galvanic connected resonant structures 308-318.

Returning to FIG. 3A, the galvanic connected resonant structures 308-318 exhibit a frequency passband having a bandwidth based on the wavelength of the propagated RF signal. The bandwidth of the frequency passband may be tuned with a tuning element, such as a first tuning element 322 and a second tuning element 324. As one example, the tuning elements 322, 324 are inductive couple shunts. Additionally, resonator stubs 326 may be coupled to the first transmission line conductor 303 and disposed on the dielectric material 304 (e.g., on the transmission line layer 306 between the first and second transmission line conductors 303 and 305). The resonator stubs 326 can facilitate tuning the frequency passband.

Figure 4:
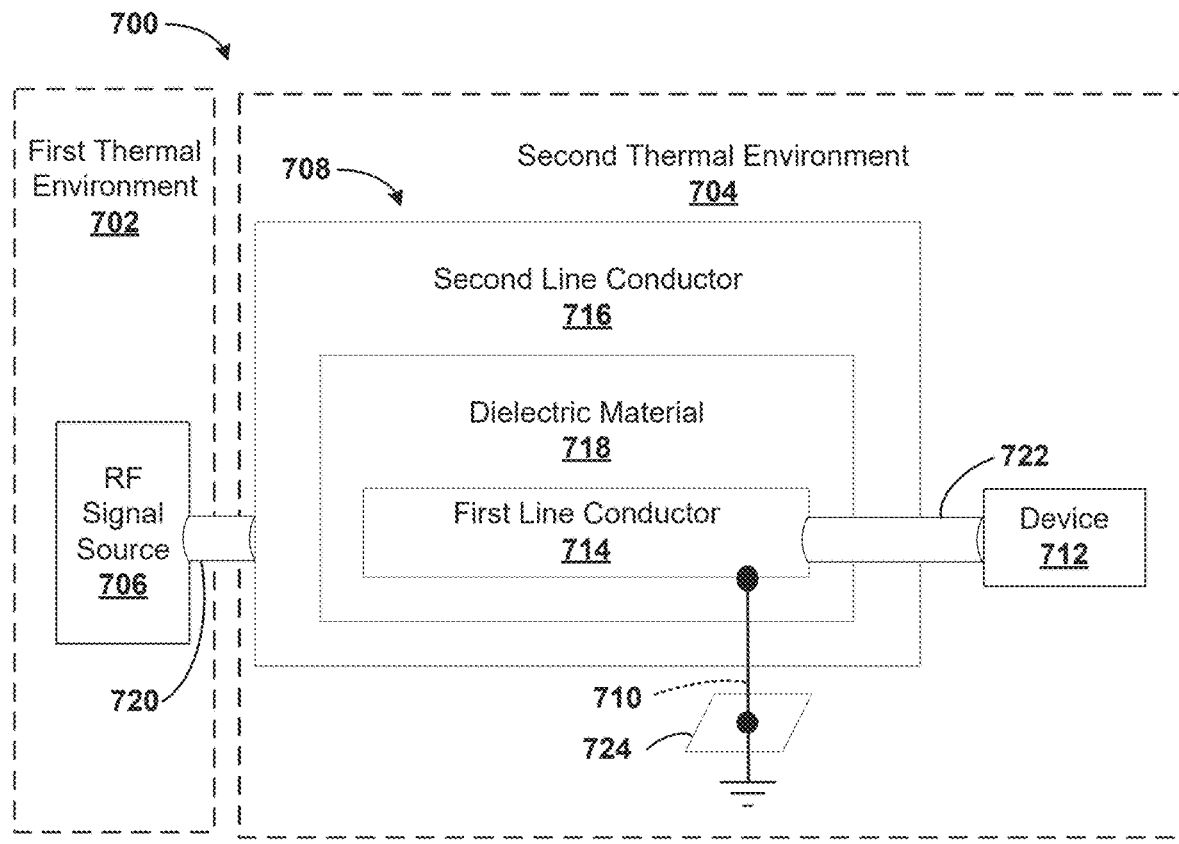
FIG. 4 illustrates an example of a communication system having the RF signal line with the galvanic connected resonant structure in a multi-thermal environment.

FIG. 4 illustrates an example of a communication system having the RF transmission line system 700 in a multi-thermal environment. The multi-thermal environment includes a first thermal environment 702 and a second thermal environment 704. The first thermal environment 702 has a first temperature and the second thermal environment 704 has a second temperature that is less than the first temperature. In one example, the first temperature is in a room temperature range, and the second temperature is in the milli-Kelvin temperature range such as less than 5K (e.g., less than 1K).

The first thermal environment 702 includes an RF signal source 706. The RF signal source 706 is a source that outputs an RF signal with frequencies in a range of approximately 20 kilohertz to 300 gigahertz. The second thermal environment 704 includes a transmission line 708, a galvanic connected resonant structure 710, and a device 712. The transmission line 708 (e.g., the transmission line 102 of FIG. 1) includes a first transmission line conductor 714 (e.g., the transmission line conductor 104 of FIG. 1, the first transmission line conductor 303 of FIG. 3A) and a second transmission line conductor 716 (e.g., the second transmission line conductor 305 of FIG. 3A). The first transmission line conductor 714 and the second transmission line conductor 716 are separated by a dielectric material 718 (e.g., the dielectric material 108 of FIG. 1). The RF signal source 706 provides the RF signal to the transmission line 708 through an input line 720. The RF signal is provided from the transmission line 708 to the device 712 through an output line 722.

Figure 5:
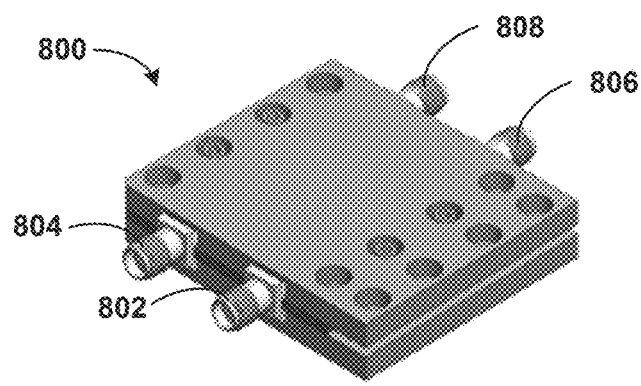
FIG. 5 illustrates an example of an interface for the RF transmission line system.

Turning to FIG. 5, an interface including a housing 800 for the RF transmission line system is shown. The housing 800 encapsulates an RF transmission line system (e.g., the RF transmission line system 100 of FIG. 1, the RF transmission line system 300 of FIG. 3A, the RF transmission line system 700 of FIG. 7).

The interface also includes inlet ports, such as a first inlet port 802 and a second inlet port 804, at a first end of the RF transmission line system. The inlet ports 802, 804 are configured to receive an input line (e.g., the input line 720) such that the RF signal is provided to the RF transmission line (e.g., the transmission line 708). For example, the input line is electrically and mechanically coupled to the first inlet port 802 so that the transmission line receives an RF signal from a RF signal source (e.g., the RF signal source 706) through the input line.

The interface also includes outlet ports, such as a first outlet port 806 and a second outlet port 808, at as second end of the RF transmission line system. The outlet ports 806, 808 are configured to receive an output line (e.g., the output line 722) such that the RF signal is output to a device (e.g., the device 712) in the second thermal environment 704. For example, the output line is electrically and mechanically coupled to the first outlet port 806 so that the transmission line provides the RF signal from the transmission line to the device through the output line.

The RF signal interface for the RF transmission line system receives the input line and output line. The inlet ports 802, 804 are configured to provide access to electrical pathways at the first end of the RF transmission line system to a second end of the RF transmission line system at corresponding outlet ports 806, 808. For example, an electrical pathway may extend between the first inlet port 802, at the first end, to a first outlet port 806, at the second end of the RF transmission line system. When the input line is in the first thermal environment, the inlet ports 802, 804 may be positioned in the first thermal environment while the outlet ports 806, 808 are positioned in the second thermal environment. Accordingly, the housing 800 may straddle a thermal barrier that separates the first and second thermal environment such that the thermal barrier bounds or at least partially surrounds the housing 800 at a point between the first end and the second end of the RF transmission line system.

Returning to FIG. 4, a galvanic connected resonant structure 710 (e.g., the galvanic connected resonant structure 110 of FIG. 1, the galvanic connected resonant structures 204, 206 of FIG. 2, the galvanic connected resonant structures 308-318 of FIGS. 3A-3D) electrically couples the first transmission line conductor 714 to ground. Ground may be provided by a ground plane 724 (e.g., the first ground plane 400 of FIG. 3B and/or the second ground plane 500 of FIG. 3C). The ground plane 724 is a conductive object, such as copper sheet. In some examples, the ground plane 724 is housed in a housing (e.g., the housing 800 of FIG. 5). In other examples, the ground plane 724 is external the housing but in the second thermal environment 704. The structure length of the galvanic connected resonant structure 710 is an integer multiple of one-quarter of a wavelength of the RF signal. Due to the structure length, the galvanic connected resonant structure 710 provides cooling for the transmission line 708 by providing an electrical connection to the ground plane 724 in the second thermal environment 704.

Figure 6:
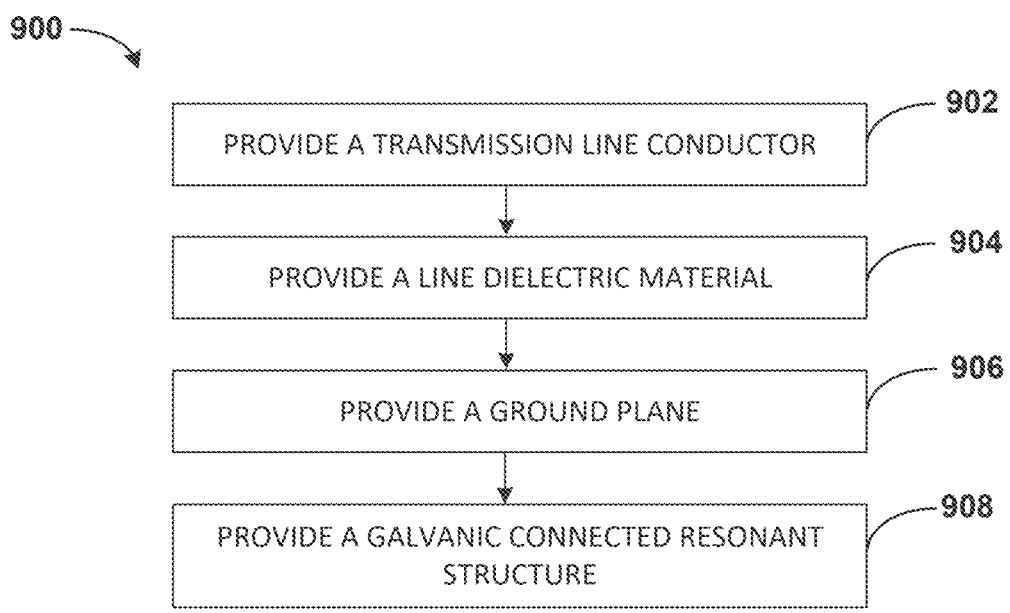
FIG. 6 illustrates a flowchart of an example method for fabricating an RF transmission line system with a galvanic connected resonant structure.

FIG. 6 illustrates a flowchart of an example method 900 for fabricating an RF transmission line system for a multi-thermal environment.

At 902, the method 900 includes fabricating an RF transmission line system comprising a transmission line conductor (e.g., the transmission line conductor 104 of FIG. 1, the first transmission line conductor 303 of FIG. 3A, the first transmission line conductor 714 of FIG. 4). In some examples, the transmission line conductor is a first transmission line conductor, and the RF transmission line system includes a second transmission line conductor (e.g., the second transmission line conductor 305 of FIG. 3A, the second transmission line conductor 716 of FIG. 7). The first and second transmission line conductors being configured to cooperate to propagate an RF signal from a first thermal environment (e.g., the first thermal environment 702 of FIG. 7) to a second thermal environment (e.g., the second thermal environment 704 of FIG. 7). The first thermal environment has a first temperature, and the second thermal environment has a second temperature less than the first temperature. For example, the second thermal environment may be a cryogenic environment having a superconducting device that is provided an RF signal from the warmer first thermal environment.

At 904, the method 900 further includes providing a dielectric material in the second thermal environment to separate the first transmission line conductor and the second transmission line conductor.

At 906, the method 900 yet further includes providing a ground plane (e.g., the first ground plane 400 of FIG. 3B, the second ground plane 500 of FIG. 3C, the ground plane 724 of FIG. 4) in the second thermal environment. As discussed above, a single ground plane may be provided or a plurality of ground planes may be provided in the RF transmission line system.

At 908, the method 900 includes providing a galvanic connected resonant structure (e.g., the galvanic connected resonant structure 110 of FIG. 1, the galvanic connected resonant structures 204, 206 of FIG. 2, the galvanic connected resonant structures 308-318 of FIGS. 3A-3D, the galvanic connected resonant structure 710 of FIG. 4) in the second thermal environment to electrically couple the first transmission line conductor to the ground plane. In one example, providing the galvanic connected resonant structure includes winding a conductor in a spiral shape. In such an example, an outer portion of the spiral shape is coupled to the first transmission line conductor and an inner portion of the spiral shape is coupled to ground. The inner portion of the spiral shape may be coupled to ground with a via if a plurality of ground planes are provided in the RF transmission line system. Alternatively, if a single ground plane is provided in the RF transmission line system, the inner portion of the spiral shape terminates at a segment end (e.g., the segment end 406 of FIG. 3B), and the galvanic connected resonant structure continues to extend from the segment end to a ground connection (e.g., the ground connection 408 of FIG. 3B). Accordingly, the second end of the galvanic connected resonant structure is dependent on the ground plane configuration of the RF transmission line system.

In one example, the method 900 may also include encapsulating the first transmission line conductor, the line dielectric material, the second transmission line conductor, the ground plane, and the galvanic connected resonant structure in a housing (e.g., the housing 800 of FIG. 5) having an inlet port (e.g., the inlet ports 802, 804 of FIG. 5) and an outlet port (e.g., the outlet ports 806, 808 of FIG. 5). The inlet port receives an input line (e.g., the input line 720 of FIG. 4) from the first thermal environment. The input line electrically couples an RF signal source (e.g., the RF signal source 706 of FIG. 4) to the RF transmission line system. The outlet port receives an output line (e.g., the output line 722) in the second thermal environment. The output line electrically couples a device, such a superconducting circuit to the RF transmission line system.

The galvanic connected resonant structure provides a low resistance electrical path from a conductor of an RF transmission line to ground. The galvanic connected resonant structure has a structure length between the first transmission line conductor and a ground connection that is an integer multiple of one-quarter of a wavelength of the RF signal and operates as a quarter wave stub that is a pass-band filter. Accordingly, devices, such as superconducting circuits, are not negatively impacted from thermal exchange from a first environment with a colder, second environment, which reduces thermal induced noise in the RF transmission line system.

In this description, unless otherwise stated, "about," "approximately" or "substantially" preceding a parameter means being within +/−10 percent of that parameter. Modifications are possible in the described embodiments, and other embodiments are possible, within the scope of the claims.

What is claimed is:

1. A radio frequency (RF) transmission line system comprising:
   a transmission line conductor configured to cooperate to propagate an RF signal from a first thermal environment to a second thermal environment, wherein the first thermal environment has a first temperature and the second thermal environment has a second temperature less than the first temperature;
   a ground plane;
   a dielectric material that is coupled between the transmission line conductor and the ground plane; and
   a galvanic connected resonant structure that electrically couples the transmission line conductor to the ground plane.

2. The RF transmission line system of claim 1, wherein the galvanic connected resonant structure has a structure length between the transmission line conductor and a ground connection of the ground plane that is an integer multiple of one-quarter of a wavelength of the RF signal.

3. The RF transmission line system of claim 2, wherein the galvanic connected resonant structure is configured to create a passband filter having a bandwidth based on the wavelength of the RF signal, the RF transmission line further comprising a tuning element configured to tune the bandwidth of the passband filter.

4. The RF transmission line system of claim 3, wherein the tuning element is an inductive couple shunt.

5. The RF transmission line system of claim 1, wherein the transmission line conductor is a first transmission line conductor, the RF transmission line system further comprises:
   a second transmission line conductor separated from the first transmission line conductor by the dielectric material, wherein the second transmission line conductor and the galvanic connected resonant structure are electrically coupled to the ground plane.

6. The RF transmission line system of claim 5, wherein the second transmission line conductor at least partially bounds the first transmission line conductor.

7. The RF transmission line system of claim 1, wherein the galvanic connected resonant structure is arranged in a spiral shape, and wherein an outer portion of the spiral shape is coupled to the transmission line conductor and an inner portion of the spiral shape is coupled to ground.

8. The RF transmission line system of claim 7, wherein the spiral shape is two-dimensional shape and ground is provided by the ground plane, and wherein the spiral shape is electrically coupled to the ground plane by a via.

9. An RF signal interface comprising the RF transmission line system of claim 1, the RF signal interface further comprising:
a housing configured to encapsulate the RF transmission line system therein;
an inlet port configured to receive an input line that propagates the RF signal and provides the RF signal to the RF transmission line system; and
an outlet port configured to provide an output line that propagates the RF signal to a superconducting circuit in the second thermal environment.

10. The RF transmission line system of claim 9, wherein the inlet port receives the input line from the first thermal environment and the outlet port receives the output line in the second thermal environment.

11. A method for fabricating a radio frequency (RF) transmission line system, the method comprising:
fabricating an RF transmission line system comprising a first transmission line conductor and a second transmission line conductor, the first and second transmission line conductors being configured to cooperate to propagate an RF signal from a first thermal environment to a second thermal environment, wherein the first thermal environment has a first temperature, and the second thermal environment has a second temperature less than the first temperature;
providing a line dielectric material in the second thermal environment to separate the first transmission line conductor and the second transmission line conductor;
providing a ground plane in the second thermal environment; and
providing a galvanic connected resonant structure in the second thermal environment to electrically couple the first transmission line conductor to the ground plane.

12. The method of claim 11, wherein the galvanic connected resonant structure has a structure length between the first transmission line conductor and a ground connection that is an integer multiple of one-quarter of a wavelength of the RF signal.

13. The method of claim 11, wherein providing the galvanic connected resonant structure includes winding a conductor in a spiral shape, and wherein an outer portion of the spiral shape is coupled to the first transmission line conductor and an inner portion of the spiral shape is coupled to ground.

14. The method of claim 13, wherein the spiral shape is two-dimensional shape electrically coupled to the ground plane by a via.

15. The method of claim 11, further comprising:
encapsulating the first transmission line conductor, the line dielectric material, the second transmission line conductor, the ground plane, and the galvanic connected resonant structure in a housing having an inlet port and an outlet port, wherein the inlet port receives an input line from the first thermal environment and the outlet port receives an output line in the second thermal environment.

16. A communication system comprising:
a signal source in a first thermal environment at a first temperature, the signal source configured to propagate an RF signal;
a superconducting circuit in a second thermal environment at a second temperature lower than the first temperature; and
an RF transmission line system that electrically couples the signal source to the superconducting circuit, the RF transmission line system comprising:
a transmission line conductor configured to propagate the RF signal from the first thermal environment to the second thermal environment;
a dielectric material that is coupled between the transmission line conductor and a ground plane; and
a galvanic connected resonant structure that electrically couples the transmission line conductor to the ground plane.

17. The communication system of claim 16, wherein the galvanic connected resonant structure has a structure length between the transmission line conductor and a ground connection that is an integer multiple of one-quarter of a wavelength of the RF signal.

18. The communication system of claim 17, wherein the galvanic connected resonant structure is configured to create a passband having a bandwidth based on the wavelength of the RF signal, the RF transmission line further comprising a tuning element configured to tune the bandwidth of the passband.

19. The communication system of claim 16, wherein the RF transmission line system further comprises a second transmission line conductor, and wherein the second transmission line conductor and the galvanic connected resonant structure are electrically coupled to the ground plane.

20. The communication system of claim 16, wherein the galvanic connected resonant structure is arranged in a spiral shape, and wherein an outer portion of the spiral shape is coupled to the transmission line conductor and an inner portion of the spiral shape is coupled to ground.

* * * * *